United States Patent
Huato et al.

(10) Patent No.: US 6,596,246 B2
(45) Date of Patent: Jul. 22, 2003

(54) PROCESS FOR PRODUCING STABLE CUPRIC HYDROXIDE AND BASIC CUPRIC SALTS

(75) Inventors: Julio Huato, Jalisco (MX); Tetsuya Ogura, Jalisco (MX)

(73) Assignee: Dermet SA de CV, Jalisco (MX)

( * ) Notice: Subject to any disclaimer, the term of this patent is extended or adjusted under 35 U.S.C. 154(b) by 23 days.

(21) Appl. No.: 09/811,669

(22) Filed: Mar. 20, 2001

(65) Prior Publication Data

US 2002/0136685 A1 Sep. 26, 2002

(51) Int. Cl.⁷ .............................. C01G 3/00; C22B 15/00
(52) U.S. Cl. ........................ 423/42; 423/43; 423/604; 423/140; 423/142
(58) Field of Search ........................... 423/42, 43, 140, 423/142, 604

(56) References Cited

U.S. PATENT DOCUMENTS

| | | | | |
|---|---|---|---|---|
| RE24,324 E | * | 5/1957 | Furness | 423/604 |
| 3,635,668 A | * | 1/1972 | Barker | 423/604 |
| 3,725,535 A | * | 4/1973 | Barker | 423/604 |
| 3,787,306 A | * | 1/1974 | Senior et al. | 423/144 |
| 4,404,169 A | * | 9/1983 | Ploss et al. | 423/604 |
| 4,418,056 A | * | 11/1983 | Gonzalez | 423/604 |
| 4,490,337 A | * | 12/1984 | Richardson | 423/604 |
| 4,614,640 A | * | 9/1986 | Ploss et al. | 423/604 |
| 4,808,406 A | * | 2/1989 | Brinkman | 423/604 |

FOREIGN PATENT DOCUMENTS

| | | | |
|---|---|---|---|
| DE | 1592441 | * | 4/1974 |
| JP | 8-012328 | * | 1/1996 |

* cited by examiner

Primary Examiner—Steven Bos
(74) Attorney, Agent, or Firm—Harness, Dickey & Pierce, P.L.C.

(57) ABSTRACT

Stable copper hydroxide is prepared by removing ferrous ion from the beginning cupric solution. The ferrous ion is oxidized to ferric ion, and the ferric ion is precipitated by raising the pH of the solution to 3–4. The utilization of phosphate ion both increases the efficiency of oxidation and simultaneously precipitates ferric ion. A second raising the pH of the purified solution precipitates highly pure copper hydroxide that can be harvested.

14 Claims, No Drawings

PROCESS FOR PRODUCING STABLE CUPRIC HYDROXIDE AND BASIC CUPRIC SALTS

BACKGROUND OF THE INVENTION

1. Field of the Invention

The invention pertains to highly stable cupric hydroxide compounds obtained by removing iron impurities from the starting copper solution.

2. Description of the Related Art

Stable copper hydroxide is a product that is difficult to obtain, even when employing a highly purified copper salt as a starting material. This is because even small amounts of ferrous ($Fe^{II}$) impurities can catalyze the decomposition of cupric hydroxide to cupric oxide:

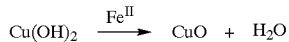

$$Cu(OH)_2 \xrightarrow{Fe^{II}} CuO + H_2O$$

Thus, a spray application of ppm $Fe^{II}$ ion can catalyze the dehydration of $Cu(OH)_2$ to CuO.

However, the production of $Cu(OH)_2$ requires starting materials that are very low in iron content. These materials are both difficult to find and are expensive, because ferrous ion is very widely distributed in any starting material. As a result, there is a need to rapidly and efficiently remove ferrous ions from the raw materials used in cupric hydroxide production.

Copper compounds, including copper hydroxide, are used to treat plant fungi. Pathogenic fungi cause a substantial reduction in expected crop yields. Further losses result from fungi during the storage of harvested crops. Although there are over 100,000 known species of fungi, no more than 200 are known to cause serious plant disease.

The classes of fungi associated with important diseases in plant crops include Phycomycetes, Asomycetes, Basidiomycetes and Deuteromycetes. Examples of Phycomycetes include Phytophthora infestans (potato late blight) and Plasmopara viticola (downy mildew of grape). Examples of Ascomycetes include *Erysiphe graminis* (powdery mildew of wheat/barley), *Podosphaera leucotricha* (apple powdery mildew) and *Pyricularia oryzae* (rice blast). Examples of Basidiomycetes include Puccinia spp. (leaf rust of wheat and oats), Rhizoctonia spp. (sheath blight of rice) and Ustiliago spp. (corn smut). Examples of Deuteromycetes include Alternaria spp. (tobacco brown spot), Botrytis spp. (gray mold of grape), Cercospora spp. (leaf spot of sugar beet), Fusarium spp. (wheat blight), Helminthosporium spp. (leaf spot of corn), *Pseudocercosporella herpotrichoides* (eyespot of wheat), *Septoria nodorum* (blotch of wheat) and *Septoria tritici* (wheat leaf blotch).

The fungicides can be classified into systemic and nonsystemic fungicides. The systemic fungicides can penetrate the seed or plant and are then redistributed within to unsprayed parts or subsequent new growth, rendering protection from fungal attack or eradicating a fungus already present. The nonsystemic fungicides have a protectant mode of action and must be applied to the surface of plant generally before infection takes place. The inorganic salts are generally classified as nonsystemic fungicides.

The use of copper as a fungicide is well known. Copper sulfate was used from treating the seed-borne disease wheat bunt (Tilletia spp.) as early as the eighteenth century. In 1882, it was observed that grapevines that had been coated with a mixture of copper sulfate and lime to deter grape pilferage were not infected with grape downy mildew (*Plasmopara viticola*). This observation resulted in the development of a fungicide called Bordeaux mixture. Copper fungicides currently available for a wide variety of applications include the hydroxides, sulfates (Bordeaux mixture), oxides and oxychlorides and a variety of organic salts such as copper naphthenates and copper quinolinates. Crops protected using copper compounds include vines, fruit, coffee, cocoa and vegetables. Most copper fungicides work by inhibiting fungal spore germination. Sensitive fungi are affected by the uptake of copper salts and its subsequent accumulation, which then complexes with amino, sulfhydryl, hydroxyl or carboxy groups of enzymes resulting in the inactivation of the fungus. Fungicides are discussed in the *Kirk-Othmer Encyclopedia of Chemical Technology*, $4^{th}$ Ed. (1994), Volume 12 at pages 204–227.

Copper compounds are also effective against bacterial plant diseases. A common bacterial plant disease amenable to treatment by copper compounds, including cupric hydroxide, is citrus canker. When environmental conditions are favorable for the spread of the disease, chemical control measures are not entirely effective. However, materials containing copper (Bordeaux mixture, copper hydroxide, basic copper chloride, copper oxychloride, and tribasic copper sulfate) are the most effective bacterial sprays for protecting leaves and fruit. These materials can reduce the incidence of disease, but they will not eliminate established infections. Extensive use of copper may also cause phytotoxicity problems in treated groves.

Copper hydroxide is also used to treat tomato bacterial spot (*Xanthomonas campestris* pv. *vesicatoria*). Copper hydroxide is applied at the first sign of disease and repeated at 10- to 14-day intervals when warm, moist conditions prevail. Copper is strictly a protectant and must be applied before an infection period occurs. Coverage is 4 lb of copper hydroxide per acre.

The most common copper fungicide incorporating copper hyhdroxide is Bordeaux mixture ($CuSO_4 \Omega 3Cu(OH)_2 \Omega 3CaSO_4$). The standard formula for Bordeaux mixture is four pounds of copper sulfate, four pounds of hydrated lime and 50 gallons of water. Mix four pounds of the lime in four gallons of water. Do the same for the copper sulfate. Strain the lime mixture through cheesecloth, add to 42 gallons of water, and then add the sulfate mixture. Use immediately. Small amounts can be made by mixing four ounces of hydrated lime in 2 gallons of water. Mix four ounces of copper sulfate in 1 gallon of water. Pour the copper sulfate mixture into the lime mixture. Bordeaux mixture can cause damage to plants if used improperly. Damage or injury results more in humid weather and when the mixture doesn't dry quickly. Bordeaux mixture will leave a bluish-white deposit on the plant.

Once made, Bordeaux mixture is not stable. Poorly stirred Bordeaux mixture has little value as the active copper compound is not sufficiently finely divided. Other materials are frequently added to Bordeaux mixture in order to increase the stability. If other materials are to be used in the mixture, they may then be added with further agitation. White oil may be used at around 500 mL/100 L of spray or similar amounts of calcium caseinate (500 g/100 L) or molasses (500 mL/100 L). White oil or summer spraying oil may be used at the rate of 500 mL/100 L spray to enhance penetration of the spray under bud scales. Similarly calcium caseinate and molasses have been recommended from time to time for various crops. These are reported to improve the weathering ability of the spray by producing a surface layer on the leaves which protects the copper particles from being dislodged by rain or irrigation.

Fungicides such as Bordeaux mixture are also characterized by sticking poorly to the plant. The sticking ability of Bordeaux mixture can also be improved by the addition of polymers. However, polymer additives tend to be expensive.

For Burgundy mixture, the slaked lime is replaced by the fully soluble washing soda (sodium carbonate). In other respects, the procedure is the same and the end results are similar although the mixture is said to stick better than Bordeaux but is also more likely to burn sensitive foliage. The main advantage of Burgundy mixture is the ease of use of the washing soda compared with slaked lime. Fresh soda should be used; old material may have less water of crystallization and it is difficult to judge the amount required. To make an equivalent Burgundy mixture to that described above for Bordeaux, replace the 1 kg of slaked lime with 1.5 kg of washing soda. If the normally crystalline washing soda appears white and powdery, use only 1 kg and then check the made-up mixture for pH before use.

Although the conventional art recognizes the applicability of copper compounds as a fungicide, the conventional art also recognizes that the copper fungicides have disadvantages that need to be rectified. Typical of the conventional art copper technology is that of the '253 patent to LeFiles et al. (U.S. Pat. No. 5,298,253) and the '738 patent to LeFiles et al. (U.S. Pat. No. 5,462,738) which pertain to a copper hydroxide dry flowable bactericide/fungicide and a method of making and using same. The bactericide/fungicide of the '253 and '738 patents is made by forming a homogeneous aqueous slurry containing between approximately 5% and 20% by weight (based on the total weight of all dry ingredients) of a first dispersant selected from the group consisting of partially neutralized polyacrylic acid having a pH 5–10 and an average molecular weight of between 1,000 and 10,000 and lignin sulfonate. A second dispersant is used for bentonite clay. A slurry is formed with phosphate stabilized cupric hydroxide and the slurry is spray dried the slurry to thereby form a dry free flowing granular bactericide/fungicide product. Although phosphate stabilized cupric hydroxide is mentioned, this solution is obtained from an aqueous slurry using polyacrylic acid as a dispersant.

The '681 patent to Pasek (U.S. Pat. No. 5,492,681) pertains to a method for producing copper oxide. In the method, a copper bearing material, aqueous ammonia, and a sufficient amount of an ammonium salt to double the rate of production of copper oxide in the absence of the salt are placed in a single vessel. The vessel is closed, and oxygen is fed into the vessel. The mixture is stirred and heated to a temperature of between approximately 70° and 130° C. to dissolve the copper bearing material into aqueous ammoniacal copper ion. The aqueous ammoniacal copper ion is reacted with the oxygen in the vessel to form solid copper oxide particles, which are then recovered. The '681 patent is a process based upon ammoniacal copper.

The '533 patent to Browne (U.S. Pat. No. 5,310,533) pertains to a method of producing copper compounds involves contacting metallic copper with oxygen or an oxygen-containing gas, with an aqueous solution consisting essentially of water in solution in which is a soluble ammonium salt $NH_4X$, where X is the anion of the salt, and with ammonia in an amount such that the solution is initially alkaline. As a result of such contact the metallic copper is initially dissolved to form a copper amine $Cu(NH_3)_4X$ and the formation of the amine continues until the saturation concentration of the amine is reached. Subsequently, the amine continuously breaks down to form $3Cu(OH)_2 \Omega CuX_2$ and the water soluble products of the amine decomposition continuously reform the amine by further reaction with the metallic copper and the oxygen on oxygen-containing gas. The '533 patent is a production of copper compounds using ammoniacal copper, and the presence phosphate is not indicated.

The '935 patent to Langner et al. (U.S. Pat. No. 4,944,935) pertains to a process of producing blue copper hydroxide, wherein copper metal is treated with an ammonium ion-containing aqueous solution with stirring and with a simultaneous introduction of an oxygen-containing gas and the reaction product is separated from the copper metal. A particulate, floatable copper (II) hydroxide is produced in that a material which contains copper metal is treated at a temperature of 0° to 40° C. with a solution which contains 0.1 to 10 g/l ammonium salt (calculated as $NH_4$), 0 to 10 g/l ammonium hydroxide (calculated $NH_3$) and, if desired, 0 to 5 g/l copper (II) salt and the resulting copper (II) hydroxide is separated. The '935 patent pertains to the production of copper hydroxide using ammonium-based compounds. Example 6 discusses ammonium salts selected from chlorides, sulfates, phosphates, nitrate, and acetate. However, a non-ammonia based process is not disclosed.

The '406 patent to Brinkman (U.S. Pat. No. 4,808,406) pertains to a method for producing finely divided stable cupric hydroxide composition of low bulk density comprising contacting solutions of an alkali metal carbonate or bicarbonate and a copper salt, precipitating a basic copper carbonate-basic copper sulfate to a minimum pH in the range of greater than 5 to about 6, contacting the precipitate with an alkali metal hydroxide and converting basic copper sulfate to cupric hydroxide, within the pH range of 7 to 11. The '406 patent pertains to the production of cupric hydroxide from a mixture of basic copper carbonate and basic copper sulfate. Phosphates are not present in the '406 patent technology.

The '337 patent to Nakaji et al. (U.S. Pat. No. 4,940,337) provides a stirring apparatus for mixing, with metallic iron masses, a concentrated strongly acidic ferric chloride waste fluid containing iron and one or more other heavy metals in which the content of nickel is highest, the stirring apparatus being characterized by comprising a rotating mechanism for rotating a container, and a passage which is disposed in a rotary shaft and through which excess gas and liquid generated during stirring is discharged into the outside. The '337 patent pertains to the separation of metals from ion chloride waste. The production of a purified copper hydroxide is not disclosed.

The '169 patent to Ploss et al. (U.S. Pat. No. 4,404,169) pertains to a process of producing cupric hydroxides having stability in storage if phosphate ions are added to a suspension of copper oxychloride in an aqueous phase. The copper oxychloride is then reacted with alkali metal hydroxide or alkaline earth metal hydroxide, and the cupric hydroxide precipitated as a result of the suspension is washed and then re-suspended and subsequently stabilized by the addition of acid phosphate to adjust a pH value of 7.5 to 9. The suspended copper oxychloride is preferably reacted in the presence of phosphate ions in an amount of 1 to 4 grams per liter of the suspension and at a temperature of 20° to 25° C. and the resulting cupric hydroxide is stabilized with phosphate ions in an amount of 3 to 6 grams per liter of the suspension. The '169 patent reacts copper oxide oxychloride in the presence of phosphate.

As has been shown, there are significant disadvantages associated with the poor stability of conventionally prepared cupric hydroxide. Even small amounts of ferrous ion will catalyze the decomposition of cupric hydroxide to cupric oxide. This poor stability inhibits the utilization of cupric oxide as a bactericide and fungicide. Additional uses of highly pure cupric hydroxide are in the fabrication of superfine metallic copper, in the preparation of catalysts and in superconductors. These disadvantages can be eliminated and the advantages attained by the development of a process that can readily produce purified and stable cupric hydroxide.

SUMMARY OF THE INVENTION

The invention, in part, pertains to a stable cupric hydroxide.

The invention, in part, pertains to a cupric solution substantially free from aluminum, ferric and ferrous ions.

The invention, in part, pertains to the removal of iron from a copper solution by oxidation and precipitation of ferric solution.

The invention, in part, pertains to the utilization of phosphate ion to increase the oxidation efficiency and to simultaneously precipitate out the formed ferric ion.

The invention, in part, pertains to the manufacture of cupric hydroxide from impure raw materials such as mother liquor from copper sulfate production.

It is to be understood that both the foregoing general description and the following detailed description are exemplary and explanatory and are intended to provide further explanation of the invention as claimed.

DETAILED DESCRIPTION

Advantages of the present invention will become more apparent from the detailed description given herein after. However, it should be understood that the detailed description and specific examples, while indicating preferred embodiments of the invention, are given by way of illustration only, since various changes and modifications within the spirit and scope of the invention will become apparent to those skilled in the art from this detailed description.

Copper can take on the cuprous $Cu^+$ and cupric $Cu^{2+}$ oxidation states. The cupric hydroxide, also called copper (II) hydroxide compounds of the invention are represented by formula I:

$$Cu(OH)_2 \qquad (I)$$

Copper(II) hydroxide is prone to decomposition to the oxide, as is represented by formula II:

$$Cu(OH)_2 \rightarrow CuO + H_2O \qquad (II)$$

The inventors found that this decomposition is catalyzed by metal species such as iron. The inventors believe that the true catalytic species is $Fe^{2+}$ occluded (interstitially) in the crystal lattice of $Cu(OH)_2$, which changes its molecular structure on being oxidized to $Fe^{3+}$ and destroys the $Cu(OH)_2$ crystal to form more stable product, CuO. Furthermore, the CuO produced catalyzes the dehydration reaction forming more CuO. Therefore, inhibition of this reaction is necessary to obtain a stable product.

Copper(II) hydroxide is described in the *Kirk Othmer Encyclopedia of Chemical Technology* as being produced by a reaction of a copper salt solution and sodium hydroxide to form a blue, gelatinous, voluminous precipitate of limited stability. Efforts are concentrated at stabilizing the product, especially in industrial production. Usually ammonia or phosphates are incorporated into the hydroxide to produce a color-stable product. The ammonia processed copper hydroxide is almost stoichiometric and copper content as high as 64% is not uncommon. The phosphate-produced material is lower in copper and has a finer particle size and higher surface area than ammonia processed hydroxide. Other methods of production generally rely on the formation of an insoluble copper precursor prior to the formation of the hydroxide. (*Kirk Othmer Encyclopedia of Chemical Technology*, Fourth Ed., Vol. 7, p. 508 (John Wiley & Sons 1993)). However, the products produced by these methods are not stable enough to dry by use of spray drying.

Copper hydroxide is almost insoluble in water (3 $\mu$g/L) but readily dissolves in mineral acids and ammonia forming salt solutions or copper amine complexes. The hydroxide is somewhat amphoteric dissolving in excess sodium hydroxide solution for form trihydroxycuprate $Cu(OH)_3^-$ and tetrahydrocuprate $Cu(OH)_4^-$.

Copper(II) hydroxide has been conventionally prepared by the addition of sodium hydroxide, NaOH, to a salt of copper and decomposing at a temperature above 100° C. In the presence of excess alkali, the decomposition occurs at temperatures above 50° C.

When ferrous impurities are present in copper-containing raw materials, the inventors have found it feasible to precipitate out the ferrous ion an aqueous solution by oxidizing it to ferric ion, especially to ferric phosphate. The ferrous ion is oxidized using common oxidants such as $H_2O_2$, hypochlorite (bleach), $Cl_2$, $O_2$, $O_3$, etc. The possible range of oxidizing agents includes singlet oxygen, triplet oxygen, singlet or triplet oxygen containing gas, ozone, ozone containing gas, chlorine, chlorine containing gas, chlorine dioxide, chlorine dioxide containing gas, hypochlorite ion, and chlorite ion. Blowing air through the solution will also oxidize ferrous ion to ferric ion, but the oxygen in air oxidizes the ion rather slowly. Mixtures of oxidizing agents can also be used.

Moreover, the oxidation of ferrous ion proceeds slowly. Therefore, heating of the reaction mixture is preferable to elevate the conversion efficiency. The heating temperature can range from about 20° C. to 130° C. A preferred heat temperature range is about 80–100° C. A preferable temperature is about 100° C.

Utilization of the appropriate counterion will make the oxidation more efficient and promote precipitation of the ferric salt. The utilization of phosphate ion both increases the efficiency of oxidation and simultaneously precipitates ferric ion. Alternatively, fluoride ion has been found to be effective.

It is known that aqueous cupric ion precipitates forming a basic salt such as tribasic cupric sulfate $CuSO_4 \cdot 3Cu(OH)_2$, cupric oxychloride $CuCl_2 \cdot 3Cu(OH)_2$, cupric basic carbonate $CuCO_3 \cdot 3Cu(OH)_2$, etc. by increasing the solution pH. The inventors found that the formation of the basic salts begins at a pH of about 3.5 and is complete at a pH of about 7. The preferable pH for obtaining the basic copper salt is a pH of about 6. However, the precipitation of ferric ion as ferric oxide or phosphate is the more efficient at the higher pH. As a result, the pH best suited for the precipitation of ferric ion is concluded to be a pH of about 1–4 and preferably about 3.5. Most common bases can be used to raise the pH to the 1–4 range. Preferred bases include aqueous $NH_3$, $Na_2CO_3$, $K_2CO_3$ and $KHCO_3$.

The hardly soluble ferric compounds such as ferric oxide and ferric phosphate in copper hydroxide do not greatly decrease the stability of copper hydroxide against the decomposition to form CuO and $H_2O$. However, it is preferable to remove the precipitate formed from the oxidized cupric solution in order to obtain a purer product.

Next, a base is added to the filtrate to bring the pH to about 6. The basic copper salts, such as $CuSO_4 \cdot 3Cu(OH)_2$, $CuCl_2 \cdot 3Cu(OH)_2$, $CuCO_3 \cdot 3Cu(OH)_2$, etc., precipitate out. These salts can then be harvested.

When the pH of the reaction mixture or a suspension of basic salt is elevated to a pH of about 8 or more, the basic salts suspended in the solution are converted to cupric hydroxide. The complete conversion to copper hydroxide product is attained by adding additional base until the pH rises to about 12. The bases used to precipitate the cupric hydroxide can be an alkali metal hydroxide and/or an alkaline earth metal hydroxide. Examples of the bases include KOH, NaOH, LiOH, $Ca(OH)_2$, $Mg(OH)_2$, etc. The bases used to precipitate the cupric hydroxide can also be a carbonate such as $K_2CO_3$ or $Na_2CO_3$. Also, the basic copper salts ($CuSO_4 \cdot 3Cu(OH)_2$, $CuCl_2 \cdot 3Cu(OH)_2$, $CuCO_3 \cdot 3Cu(OH)_2$, etc.) can be converted to copper hydroxide by rinsing the salts and adding a base.

A strong base such as NaOH or KOH is apt to give an unstable product against the dehydrating decomposition reaction, presumably caused by the drastic pH change at the interface of added base solution and the copper containing solution forcing unselective precipitation to the existing species. As a result, a weak base such as sodium carbonate or bicarbonate and $NH_3$ is preferable.

The removal of ferrous ion is highly satisfactory when copper sulfate is used as the raw material. However, copper chloride solutions are more difficult to purify and copper sulfate solutions. The reason for the difficulty associated with copper chloride may be in view of the notably higher coordination potential of chloride ion compared to sulfate ion, which leads to soluble coordination products, especially in chloride concentrations greater than about 2 M.

Copper hydroxide can be prepared by using the mother liquor left after crystallization of copper sulfate using the ferrous removal method of the invention. The ferric hydroxide product was sufficiently stable so that the product can be dried by spray drying.

Removal of solids formed during the process, which can be either ferric ion or cupric hydroxide product, can be performed using a number of methods. Solids can be removed using filtration, centrifugation or decantation. On an industrial scale, filter presses or drum centrifuges can be used.

EXAMPLE 1

Preparation of Copper Hydroxide From Industrial Grade Copper Sulfate

Five ml of 85% $H_3PO_4$ and 0.8 ml of 50% $H_2O_2$ were added dropwise to 100 ml of a copper sulfate solution that had been prepared from 25 g of industrial grade $CuSO_4 \cdot 5H_2O$. A 3 M solution of $Na_2CO_3$ solution was used to adjust the pH to 3.5. The solution was then heated to 100° C. and kept at 100° C. with stirring overnight.

The solution was cooled to 40° C. and the solution was adjusted to a pH of 3.5 using 3 M $Na_2CO_3$. A precipitate formed and was filtered off. 3 M $Na_2CO_3$ was added to the filtrate under vigorous stirring to rapidly reach a pH of 6. Then the 3 M $Na_2CO_3$ was added dropwise until a pH of 12 was attained. The mixture was stirred for 24 hours. A deep blue precipitate was formed. The precipitate was filtered, washed and dried at 110° C. to obtain copper hydroxide product.

EXAMPLE 2

Preparation of Copper Hydroxide From ACS Reagent Grade Copper Chloride

Five ml of 85% $H_3PO_4$ and 2 ml of bleach containing 6% active chlorine were added dropwise to 100 ml of a solution containing 14.4 g of ACS reagent grade $CuCl_2 \cdot 2H_2O$. A 3 M solution of $Na_2CO_3$ solution was used to adjust the pH to 3.5. The solution was then heated to 100° C. and kept at 100° C. with stirring overnight.

After allowing to cool to 25° C., a small quantity of precipitate formed and was filtered off. Aqueous 5 M $NH_3$ was added to the filtrate under vigorous stirring to adjust the pH to 6. The supernatant solution was decanted off and the precipitate formed was rinsed repeatedly by decantation. The precipitate was re-suspended, and a 3 M $Na_2CO_3$ solution was added dropwise until the pH was adjusted to 12. A deep blue precipitate formed, and the precipitate was filtered and rinsed. The copper hydroxide product was dried at 80° C.

EXAMPLE 3

Preparation of Copper Hydroxide From Mother Liquor

A 3000 L charge of water containing 30 L of 85% $H_3PO_4$ and 25 L of 50% $H_2O_2$ were added under vigorous stirring to 3000 L of mother liquor left after the crystallization of copper sulfate. The mother liquor contained 79 g of Cu ion per liter. Aqueous 15 M $NH_3$ was added to the solution until a pH of 3.5 was attained. The resultant mixture was heated to 85° C. and kept overnight at that temperature while maintaining a pH of 3.5 by injecting 8 M $NH_3$ when needed.

The solution was allowed to cool to 50° C. A precipitate formed and it was removed using a filter press. 15 M $NH_3$ was added to the filtrate under vigorous stirring until a pH of 6 was attained. The precipitate was rinsed by decantation 3 times. After the final decantation, the precipitate was re-suspended and 3 M $Na_2CO_3$ was added until the pH reached 12. The mixture was kept stirring overnight. Deep blue copper hydroxide was obtained by drum filtration and spray dried.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

We claim:

1. A process for producing cupric hydroxide comprising the steps of:

providing an aqueous solution containing a cupric ion and a ferrous ion;

adding phosphate ions or fluoride ions to said aqueous solution promote oxidation;

oxidizing said ferrous ion to ferric ion;

precipitating the ferric ion;

removing the ferric ion from the aqueous solution;

precipitating basic cupric salt; and precipitating the cupric hydroxide.

2. The process according to claim 1, which further comprises the steps of:

reacting the basic cupric salt with a base to precipitate the cupric hydroxide; and washing the precipitated cupric hydroxide.

3. The process according to claim 1, wherein the cupric ion includes an anion which is at least one member selected from the group consisting of sulfate, chloride and phosphate.

4. The process according to claim 1, wherein the ferrous ion is oxidized to ferric ion at a temperature of about 20–130° C.

5. The process according to claim 1, wherein the ferrous ion is oxidized to ferric ion at a temperature of about 100° C.

6. The process according to claim 1, wherein the oxidizing step is performed with an oxidizing agent which is at least one member selected from the group consisting of singlet oxygen, triplet oxygen, singlet or triplet oxygen containing gas, ozone, ozone containing gas, chlorine, chlorine containing gas, chlorine dioxide, chlorine dioxide containing gas, hypochlorite ion and chlorite ion.

7. The process according to claim 1, wherein removing the ferric ion is performed by a process selected from the group consisting of centrifugation, decantation and filtration.

8. The process according to claim 1, wherein precipitating the ferric ion is performed at a pH of about 3–4.

9. The process according to claim 1, wherein precipitating the basic cupric salt is performed at a pH of about 6.

10. The process according to claim 1, wherein precipitating the cupric hydroxide is performed at a pH of about 8–12.

11. The process according to claim 1, wherein precipitating the ferric ion is performed with a base selected from the group consisting of $NH_3$ and $Na_2CO_3$.

12. The process according to claim 1, wherein precipitating the basic cupric salt is performed with a base selected from the group consisting of an alkali metal hydroxide, an alkaline earth metal hydroxide, $NH_3$, $Na_2CO_3$ and $K_2CO_3$.

13. The process according to claim 1, wherein precipitating the cupric hydroxide is performed with a base selected from the group consisting of an alkali metal hydroxide, an alkaline earth metal hydroxide, $NH_3$, $Na_2CO_3$ and $K_2CO_3$.

14. The process according to claim 1, wherein the basic cupric salt is at least one member selected from the group consisting of $CuSO_4 3Cu(OH)_2$, $CuCl_2 3Cu(OH)_2$ and $CuCO_3 3Cu(OH)_2$.

* * * * *